United States Patent
Susel et al.

(10) Patent No.: US 10,251,018 B1
(45) Date of Patent: Apr. 2, 2019

(54) IMPROVING COMPUTER MODEL ACCURACY IN PREDICTING LOCATION OF ONLINE SYSTEM USERS

(71) Applicant: Facebook, Inc., Menlo Park, CA (US)

(72) Inventors: Tom Susel, London (GB); Benjamin Tucker Savage, London (GB)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/711,868

(22) Filed: Sep. 21, 2017

(51) Int. Cl.
| | |
|---|---|
| *H04W 4/02* | (2018.01) |
| *G06N 99/00* | (2019.01) |
| *H04W 88/08* | (2009.01) |
| *H04W 64/00* | (2009.01) |
| *G06Q 50/00* | (2012.01) |

(52) U.S. Cl.
CPC .......... *H04W 4/02* (2013.01); *G06N 99/005* (2013.01); *H04W 64/003* (2013.01); *H04W 88/08* (2013.01); *G06Q 50/01* (2013.01)

(58) Field of Classification Search
CPC ......... H04W 4/80; H04W 64/00; H04W 4/02; H04W 4/021; H04W 4/023; H04W 4/029; H04W 4/025; H04W 4/08; H04W 4/04; H04W 4/043; H04W 64/003; H04W 4/06; H04W 4/38; H04W 4/70; H04W 24/08; H04B 17/318; H04B 5/0062; G06Q 30/0261; G06Q 20/3278; G06Q 10/04; G06N 99/005; G06N 5/047; G06N 5/02

USPC ...... 455/456.1–457; 705/14.49–14.58, 14.64
See application file for complete search history.

(56) References Cited

U.S. PATENT DOCUMENTS

| | | | |
|---|---|---|---|
| 2014/0067901 A1* | 3/2014 | Shaw | G06Q 10/10 709/201 |
| 2016/0021503 A1* | 1/2016 | Tapia | H04W 24/02 455/456.1 |
| 2016/0323754 A1* | 11/2016 | Friday | H04W 16/28 |
| 2017/0188183 A1* | 6/2017 | Lihosit | H04W 4/80 |
| 2017/0251068 A1* | 8/2017 | Kappler | H04L 67/18 |
| 2018/0246877 A1* | 8/2018 | Vainas | G06F 17/278 |

* cited by examiner

*Primary Examiner* — Allahyar Kasraian
(74) *Attorney, Agent, or Firm* — Fenwick & West LLP

(57) ABSTRACT

An online system receives a request from a user of a manager transmitter to generate a unique beacon identifier (ID) associated with a physical location. Responsive to receiving the beacon ID from the online system, the manager transmitter transmits a Bluetooth signal comprising the beacon ID to user client devices, which send the beacon ID to the online system for identification. Responsive to detecting that a received signal strength exceeds a threshold, a location context module classifies the instance of the user client device detecting the signal as an example of a user being present at the physical location. A location prediction module uses the instance as training data to train a machine-learning model to predict the presence of online system users at the physical location.

20 Claims, 3 Drawing Sheets

IMPROVING COMPUTER MODEL ACCURACY IN PREDICTING LOCATION OF ONLINE SYSTEM USERS

BACKGROUND

The disclosure relates generally to online systems, and in particular to training a computer model to predict whether a user device is at a location based on context information received from client devices.

An online system, such as a social networking system, allows its users to connect to and communicate with other online system users. Users may create profiles on an online system that are tied to their identities and use information about the users, such as interests and demographic information. The users may be individuals or entities such as corporations or charities. Because of the increasing popularity of online systems and increasing amount of user-specific information that they maintain, an online system provides an ideal forum for content providers to increase awareness about products or services by presenting content items to online system users as stories in social networking newsfeeds or via other presentation mechanisms.

Content providers may wish to measure the effectiveness of their online system content campaigns by tracking online system users who accessed the content campaign and subsequently visited the content provider's physical location. Traditionally, online systems have relied on user "check-ins" at physical locations in order to gather user location information. However, data is collected slowly using this method and is dependent upon individual users taking an action (i.e., the check-in) at the location and designating the correct physical location. Many users do not regularly, if ever, check-in to locations. Further, there are many locations where users rarely check in (e.g., grocery stores, drug stores, dry cleaners, etc.), rendering the online system's ability to predict when a user is at those locations more difficult.

SUMMARY

To enable the online system to predict a user's presence at a physical location and tailor content items sent to the user's client device, location data for an area is determined when a device is within range of a beacon associated with the location. A portable or static device for a user associated with the location (and normally at the location), termed a manager transmitter, may be used to determine the presence of other users at the location and determine relevant location data. A manager transmitter transmits a short-range signal comprising a unique beacon identifier (ID) that is received by client devices and used to predict the presence of the client devices at the location. As various devices are within range of the beacon transmitted by the manager transmitter, the devices may report characteristics of the wireless signals in the environment. These characteristics may differ from device to device, and the online system uses the various characteristics reported by different devices to generate a model predicting a device is at the location based on the signals received by a device. The model may thus be trained using the data of devices within range of the beacon generated by the manager transmitter as a positive data set for the location and subsequently not require the beacon to predict presence at the location.

In one embodiment, the online system receives a request from a manager transmitter associated with the owner or manager of a business or organization comprising a request to generate a beacon identifier (ID) for a physical location. The online system generates a unique beacon ID responsive to receiving the request along with registration information including the name of the business and the physical location associated with the beacon ID. The manager transmitter receives the beacon ID and begins transmitting a signal including the beacon ID when the manager transmitter is present at the physical location or responsive to receiving user input comprising a request to begin transmission. The signal may be transmitted by various short-range signal technologies, such as low-energy Bluetooth.

A user client device associated with an online system user detects the short-range signal and sends the received beacon ID to the online system for identification. The user client device communicates directly with the servers of the online system but does not communicate with the manager transmitter directly other than receiving the short-range signal transmitted by the manager transmitter. The online system identifies the beacon ID based on the stored registration information. Responsive to detecting that the received signal strength exceeds a threshold, the online system classifies the instance of the user client device detecting the Bluetooth signal as an example of a user being present at the physical location associated with the beacon ID. The client device may also gather contextual information and send it to the online system.

The online system receives context information from the user client device comprising visible wireless networks with associated network strengths, visible Bluetooth signals with associated signal strengths, altimeter reading, and time of day. Collecting context information from different types of user client devices allows the online system to obtain a better sample of devices representative of visitors to the physical location and determine the context of that environment as seen by the various devices.

The online system generates a machine-learning model and uses the received context information to train the model to predict the presence of online system users at locations associated with beacon IDs. Once trained, the machine-learning model outputs an indication of whether the user client device is present at the physical location based on context information of the device. This can permit subsequent client devices to be associated with the location without relying on the beacon ID. The beacon ID can be used to initially determine positive examples of devices at the location and thus generate a positive training set of context information, without requiring the beacon for later use by the model. Responsive to determining that the likelihood that a user client device is present at the location exceeds a threshold, the online system may associate the user with that location. With the location, the online system may confirm a previously-delivered content item relating to that location was effective or determine content selection based on the association with the location.

The features and advantages described in this summary and the following description are not all-inclusive. Many additional features and advantages will be apparent to one of ordinary skill in the art in view of the drawings, specification, and claims herein.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
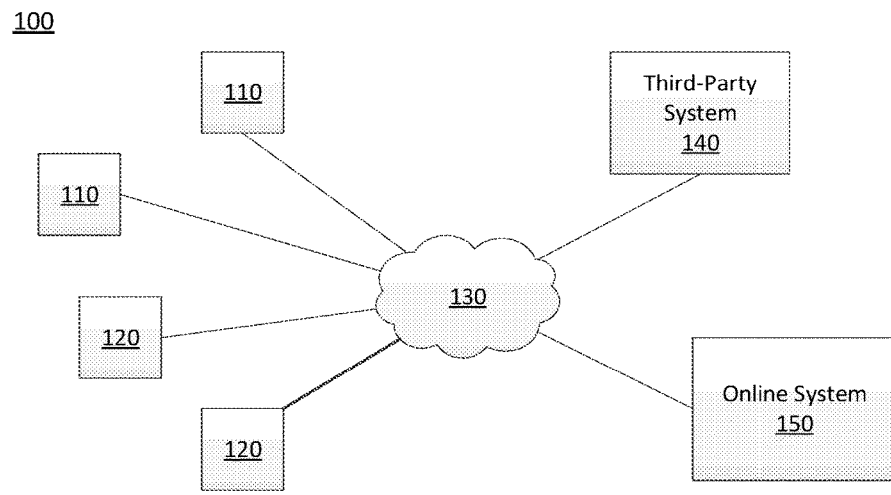
FIG. 1 is a block diagram of a system environment in which an online system operates, in accordance with an embodiment.

FIG. 1 is a block diagram of a system environment 100 for an online system 150. One or more users, using user client devices 110 and manager transmitters 120, are in communication via a network 130 and an online system 150. In alternative configurations, different and/or additional components may be included in the system environment 100.

The online system 150 may comprise a social networking system. The users can access the services provided by the online system 150 and the third party system 140 via the network 130 to view and interact with various content items. When a manager transmitter 120 associated with a unique beacon identifier (ID) begins transmitting a short-range signal including the beacon ID, the online system 150 gathers context information received from user client devices 110 and uses the received context information as training data to better predict the likelihood that a user of a user client device 110 is in the physical location associated with the beacon ID. One example of a short-range signal, Bluetooth, is used throughout the specification. The short-range signal transmits data using a wireless transmission, such as radio waves, that can embed a unique identifier associated with the transmitting device. In one embodiment, the short-range signal enables communication between devices within approximately ten meters of each other.

The user client devices 110 and manager transmitters 120 are computing devices capable of receiving user input as well as transmitting and/or receiving data via the network 130. In one embodiment, the device 110 and the transmitter 120 are conventional computer systems, such as a desktop or laptop computer. Alternatively, the device 110 and the transmitter 120 may be devices having computer functionality, such as a personal digital assistant (PDA), a mobile telephone, a smartphone, or another suitable device. The device 110 and the transmitter 120 are configured to communicate with the online system 150 via the network 130. In one embodiment, the user client device 110 receives short-range signals transmitted by the manager transmitter 120 but does not otherwise communicate with the manager transmitter 120. Rather, the user client device 110 communicates directly with the servers of the online system 150.

In one embodiment, the device 110 and the transmitter 120 execute an application allowing the users of the device 110 and the transmitter 120 to interact with the online system 150. For example, the device 110 and the transmitter 120 execute a browser application to enable interaction between the device 110 and the transmitter 120 and the online system 150 via the network 130. In another embodiment, the device 110 and the transmitter 120 interact with the online system 150 through an application programming interface (API) running on a native operating system of the device 110 and the transmitter 120, such as IOS® or ANDROID™.

The device 110 and the transmitter 120 are configured to transmit context information using wireless communication protocols, e.g., Bluetooth. For example, the context information transmitted from the device 110 and the transmitter 120 can include location, visible wireless networks with associated network strengths, visible Bluetooth signals with associated signal strengths, altimeter reading, and time of day. In some embodiments, the signals from the device 110 and the transmitter 120 allow the online system 150 to derive visit data for further processing.

The manager transmitter 120 is a device that has an online system application installed on the device and is associated with a beacon ID. In one embodiment, the manager transmitter 120 is a portable computing device (e.g., a smartphone) associated with a user of the online system 150 who has opted-in to a feature that allows the device to transmit a beacon. In other embodiments, the manager transmitter 120 is a fixed device, such as a point-of-sale system at the physical location associated with the beacon.

A user of a manager transmitter 120 provides input allowing the online system application to access the location of the manager transmitter 120 when the online system application is in use. In one embodiment, a manager transmitter 120 is associated with a user of the online system 150 who is an owner, manager, or employee of a business or organization. The manager transmitter 120 acts as a beacon to collect context information from the user client devices 110 responsive to the user of the manager transmitter 120 instructing the online system 150 to begin broadcasting.

The user client device 110 is a device that has the online system application installed on the device and is associated with a user that is present at the physical location associated with the beacon ID. A user of a user client device 110 provides input allowing the online system application to access the location of the device 110 when the online system application is in use. The online system 150 collects context information from the user client device 110 responsive to the user client device 110 detecting the Bluetooth signal.

The network 130 may comprise any combination of local area and/or wide area networks, using both wired and/or wireless communication systems. In one embodiment, the network 130 using standard communications technologies and protocols. For example, the network 130 includes communications links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communications links of the network 130 may be encrypted using any suitable technique or techniques.

One or more third party systems 140 are coupled to the network 130 for communicating with the online system 150, which is further described below in conjunction with FIG. 2. In one embodiment, a third party system 140 is an application provider communicating information describing applications for execution by the device 110 and the transmitter 120 or communicating to the device 110 and the transmitter 120 for use by an application executing on the device 110 and the transmitter 120. In other embodiments, a third party system 140 provides content or other information for presentation via the device 110 and the transmitter 120. A third party system 140 communicates information to the online system 150, such as advertisements, content, or information about an application provided by the third party system 140.

Online System

Figure 2:
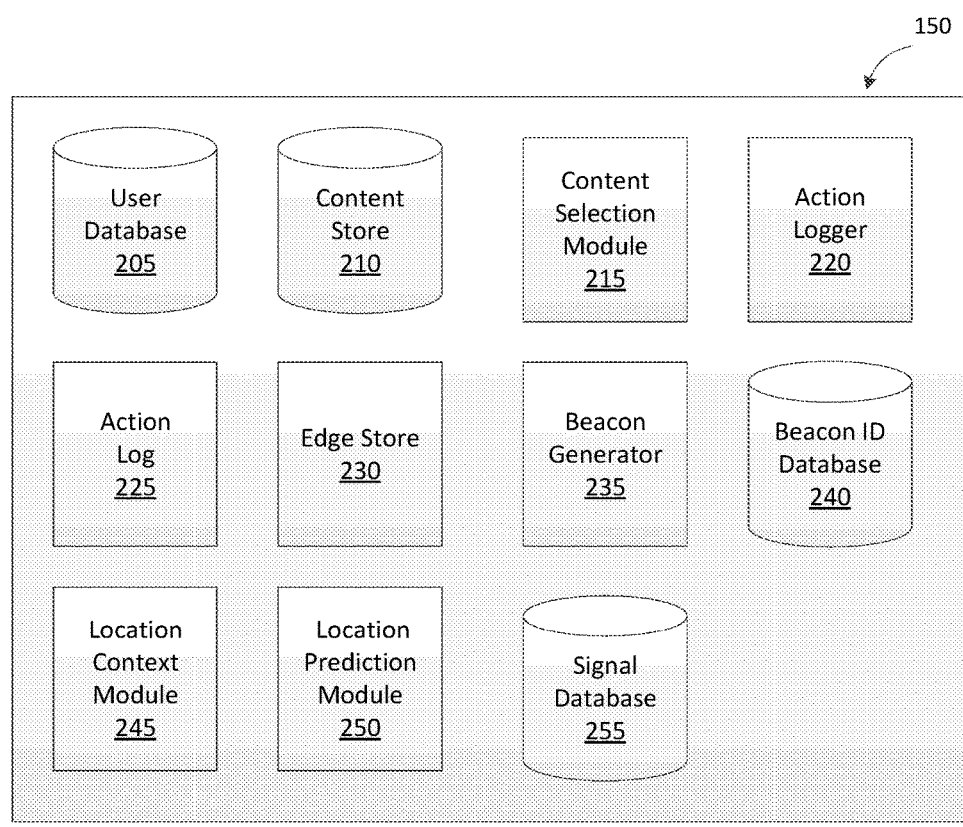
FIG. 2 is a block diagram of an online system, in accordance with an embodiment.

FIG. 2 is a block diagram of an architecture of the online system 150. The online system 150 maintains information about its users and selects content items to provide to users that user can interact with. If a user has enabled location services for the online system 150 on the user client device 110 and accesses the online system 150, the online system 150 uses context information received from the user client device 110 as training data to better predict the presence of users in the physical location associated with the beacon ID and to tailor content items for the user based on the user's location and interests.

The online system shown in FIG. 2 includes a user database 205, a content store 210, a content selection module 215, an action logger 220, an action log 225, an edge store 230, a beacon generator 235, a beacon identifier (ID) database 240, a location context module 245, a location prediction module 250, and a signal database 255. In other embodiments, the online system 150 may include additional, fewer, or different components for various applications. Conventional components such as network interfaces, security functions, load balancers, failover servers, management and network operations consoles, and the like are not shown so as to not obscure the details of the system architecture.

Each user of the online system 150 is associated with a user profile, which is stored in the user database 205. A user profile includes declarative information about the user that was explicitly shared by the user and may also include profile information inferred by the online system 150. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location, and the like. A user profile may also store other information provided by the user, for example, images or videos. In certain embodiments, images of users may be tagged with information identifying the online system users displayed in an image. In another embodiment, a user profile in the user database 205 maintains references to actions performed by the corresponding user on content items stored in the content store 210 and stores those actions in the action log 225.

While user profiles in the user database 205 are frequently associated with individuals, allowing individuals to interact with each other via the online system 150, user profiles may also be stored for entities such as businesses or organizations. This allows an entity to establish a presence on the online system 150 for connecting and exchanging content with other online system users. The entity may post information about itself, about its products, or provide other information to users of the online system 150 using a brand page associated with the entity's user profile. Other users of the online system 150 may connect to the brand page to receive information posted to the brand page or to receive information from the brand page. A user profile associated with the brand page may include information about the entity itself, providing users with background or information data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 150, events, groups, or applications. In some embodiments, objects are received from third-party applications or third-party applications separate from the online system 150. In one embodiment, objects in the content store 210 represent single pieces of content, or content "items." Hence, users of the online system 150 are encouraged to communicate with each other by posting text and content items of various types of media to the online system 150 through various communication channels. This increases the amount of interaction of users with each other and increases the frequency with which users interact within the online system 150.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 150 if content in the content item is presented to a user, if the content in the content item receives a user interaction when presented, or if any suitable condition is satisfied when content in the content item is presented to a user. For example, the bid amount included in a content item specifies a monetary amount that the online system 150 receives from a user who provided the content item to the online system 150 if content in the content item is displayed. In some embodiments, the expected value to the online system 150 of presenting the content from the content item may be determined by multiplying the bid amount by a probability of the content of the content item being accessed by a user The content selection module 215 selects one or more content items for communication to client devices 110 to be presented to users of the online system 150. Content items eligible for presentation to the user are retrieved from the content store 210 or from another source by the content selection module 215, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 215 includes content items eligible for presentation to the user in one or more selection processes, which identify a set of content items for presentation to the user. For example, the content selection module 215 determines measures of relevance of various content items to the user based on characteristics associated with the user by the online system 150 and based on the user's affinity for different content items. Based on the measures of relevance, the content selection module 215 selects content items for presentation to the user. As an additional example, the content selection module 215 selects content items having the highest measures of relevance or having at least a threshold measure of relevance for presentation to the user. Alternatively, the content selection module 215 ranks content items based on their associated measures of relevance and selects content items having the highest positions in the ranking or having at least a threshold position in the ranking for presentation to the user.

The action logger 220 receives communications about user actions internal to and/or external to the online system 150, populating the action log 225 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 225.

The action logger 220 is used by the online system 150 to track user actions on the online system 150, as well as actions on third party systems 140 that communicate information to the online system 150. Users may interact with various objects on the online system 150, and information describing these interactions is stored in the action log 225. Examples of interactions with objects include commenting on posts, sharing links, checking-in to physical locations via a mobile device, accessing content items, and any other suitable interactions. Additional examples of interactions with objects on the online system 140 that are included in the action log 225 include: commenting on a photo album, communicating with a user, establishing a connection with an object, joining an event, joining a group, creating an event, authorizing an application, using an application, expressing a preference for an object ("liking" the object), and engaging in a transaction. Additionally, the action logger 220 may record a user's interactions with advertisements of the online system 150 as well as with other applications operating on the online system 150. In some embodiments, data from the action log 225 is used to infer interests or preferences of a user, augmenting the interests included in the user's profile and allowing a more complete understanding of user preferences.

In one embodiment, the action log 225 also stores user actions taken on a third party system 140, such as an external website, and communicated to the online system 150. For example, an e-commerce website may recognize a user of an online system 150 through a social plug-in enabling the e-commerce website to identify the user of the online system 150. Because users of the online system 150 are uniquely identifiable, e-commerce websites, such as in the preceding example, may communicate information about a user's actions outside of the online system 150 to the online system 150 for association with the user. Hence, the action logger 220 may record information about actions users perform on a third party system 140, including webpage viewing histories, content items that were engaged, purchases made, and other patterns from shopping and buying.

In one embodiment, the edge store 230 stores information describing connections between users and other objects of the online system 150 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 150, such as expressing interest in a page on the online system 150, sharing a link with other users of the online system 150, and commenting on posts made by other users of the online system 150. Users and objects can be represented as nodes connected by these edges in a social graph. Once a user has interacted with an object, the edge in the graph links that user with that object, and this link can be used in the future to serve other content to the user related to that object to which the user has a connection.

In one embodiment, an edge includes various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 150, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 230 also stores information about edges, such as affinity scores for objects, interests, and other users. In one embodiment, affinity scores, or "affinities," are computed by the online system 150 over time to approximate a user's interest in an object or another user in the online system 150 based on the actions performed by the user. A user's affinity may be computed by the online system 150 over time to approximate a user's affinity for an object, interest, and other users in the online system 150 based on the actions performed by the user. Multiple interactions between a user and a specific object may be stored as a single edge in the edge store 230, in one embodiment. Alternatively, each interaction between a user and a specific object is stored as a separate edge. In some embodiments, connections between users may be stored in the user database 205, or the user database 205 may access the edge store 230 to determine connections between users.

The beacon generator 235 generates a unique beacon identifier ("beacon ID") and sends the beacon ID to the manager transmitter 120. In one embodiment, the beacon generator 235 generates a beacon ID responsive to user input. In another embodiment, the beacon ID is generated automatically responsive to the user of the manager transmitter 120 registering the location as a business with the online system 150. For each generated beacon ID, the beacon generator 235 gathers registration information and sends the beacon ID and registration information to the beacon ID database 240 for storage. In some embodiments, the registration information includes the name of the business associated with the location, the name and/or online system user information for the user who requested the beacon ID and other users associated with the beacon ID. For example, in the context of a store, the registration information might include the online system user information for both the store owner and the store manager such that both the owner and the manager can use their manager transmitters 120 to transmit the beacon ID associated with the store.

The registration information also includes the physical location associated with the beacon ID. In one embodiment, the user of the manager transmitter 120 provides input comprising the physical location associated with the beacon ID. In another embodiment, where the manager 120 is a portable computing device, the online system 150 determines the physical location responsive to the user of the manager transmitter 120 walking around the perimeter of the physical location holding the manager transmitter 120.

Responsive to receiving the beacon ID, the manager transmitter 120 stores the beacon for later transmission and receives an instruction from the online system 150 to begin transmitting the Bluetooth signal comprising the beacon ID. In one embodiment, the online system 150 instructs the manager transmitter 120 to begin transmitting the beacon ID when the online system 150 determines that the manager transmitter 120 is present at the physical location associated with the beacon ID. In another embodiment, the online system 150 instructs the manager transmitter 120 to begin transmitting the beacon ID responsive to receiving user input comprising a request to begin transmission. After receiving the instruction from the online system 150, the manager transmitter 120 begins transmitting the beacon ID and continues to do so until the online system 150 determines that the manager transmitter 120 is no longer present at the physical location associated with the beacon ID or until the online system 150 receives user input comprising an instruction to stop transmission. When a user client device 110 detects a Bluetooth signal with a signal strength over a threshold, the user client device 110 sends the received beacon ID to the online system 150 for processing and interprets the received signal as an instance of the user client device 110 being present at the physical location associated with the beacon ID.

The location context module 245 receives information from client devices of detected beacons and receives data describing context information of the client device when at a location. The location context module 245 queries the beacon ID database 240 for the registration information associated with the received beacon ID. For example, assume that a user client device 120 detects a Bluetooth signal comprising the beacon ID "e7826m21-1fa3-1284-gb16-bc221098r." The user client device 110 sends the beacon ID to the online system 150 for identification. The location context module 245 queries the beacon ID database 240, which returns registration information identifying the beacon ID as associated with "Piece of Cake Bakery." If the beacon signal strength is over a threshold, the location context module 245 classifies the instance of the user client device 110 detecting the signal as an example of a user being present at the physical location associated with the beacon ID (i.e., the bakery) and will send the instance to a signal database 255 for storage.

The location context module 245 collects context information from the user client devices 110 to generate training data. In one embodiment, the context information includes the location of the user client device 110, visible wireless networks with associated network strengths, visible Bluetooth signals and associated signal strengths, altimeter reading, and time of day. The location context module 245 sends the received context information to the signal database 255 for storage and later use in generating a machine-learning model. Collecting context information from different types of user client devices 110 allows the online system 150 to obtain a better sample of devices representative of visitors to the physical location (e.g., customers).

The location prediction module 250 applies machine learning techniques to generate a machine-learning model that determines the location of a user client device 110 based on received context information. As part of the generation of the machine-learning model, the location prediction module 250 forms a training set of data by identifying a positive training set of instances in which user client devices 110 are determined to be present at the physical location. In some embodiments, the location prediction module 250 also forms a negative training set of instances in which the user client devices 110 are determined not to be present at the physical location (e.g., if the Bluetooth signal strength does not exceed a specified threshold).

The location prediction module 250 uses supervised machine learning to train the machine-learning model, with the collected signals of the positive training set and the negative training set serving as inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The machine-learning model, when applied to the Bluetooth signal comprising a beacon ID received from a user client device 110, outputs an indication of whether the user client device 110 is present at the physical location associated with the beacon ID, such as a Boolean yes/no estimate, or a scalar value representing a probability.

In some embodiments, a validation set is formed of additional instances of received Bluetooth signals, other than those in the training sets, which have already been determined to have or lack the property in question (i.e., presence at the physical location associated with the beacon ID). The location prediction module 250 applies the trained validation model to the received Bluetooth signals of the validation set to quantify the accuracy of the machine-learning model. Common metrics applied in the accuracy measurement include: Precision=TP/(TP+FP) and Recall=TP/(TP+FN), where precision is how many the computer correctly predicted (TP or true positives) out of the total it predicted (TP+FP or false positives), and recall is how many the computer correctly predicted (TP) out of the total number of received Bluetooth signals that did have the property in question (TP+FN or false negatives). The F score (F-score=2*PR/(P+R)) unifies precision and recall into a single measure. In one embodiment, the location prediction module 250 iteratively re-trains the machine-learning model until the occurrence of a stopping condition, such as the accuracy measurement indication that the machine-learning model is sufficiently accurate, or a number of training rounds having taken place.

In some embodiments, the location prediction module 250 filters out false positives to improve the machine-learning model by polling user client devices 110 that detected the Bluetooth signal to ask whether the users of the client devices 110 were present at the physical location (e.g., "Were you in Piece of Cake Bakery today?"). In another embodiment, the location prediction module 250 weights the value of the training sample according to the Bluetooth signal strength such that the value of the sample received from the user client device 110 is as strong as the proximity to the manager transmitter 120. In instances where the physical location associated with the beacon ID is in a multi-story building (e.g., a two-floor shopping mall), the location prediction module 250 can use an altimeter to exclude signals from different floors. For example, if the distance between the user client device 110 and the manager transmitter 120 is more than two meters, the location prediction module 250 disregards the sample.

In still another embodiment, the location prediction module 250 uses cross-validation to cross-reference received samples with point-of-sale information. For example, in the context of a store, the store owner could upload to the online system 150 a list of customers who participate in the store's loyalty program, along with associated email addresses and/or phone numbers. The location prediction module 250 cross-references the received data when training the machine-learning model such that samples received from user client devices 110 associated with participants are weighted more heavily than other samples. In another embodiment, when the online system 150 receives a signal from a user client device 110, the location detection module 250 sends a notification to the manager transmitter 120 asking the user associated with the manager transmitter 120 to confirm that someone new has entered the physical location (e.g., a store) associated with the signal. If the user confirms, through the manager transmitter 120, that someone new has entered the physical location, the location prediction module 250 stores the signal as a positive instance of a user being present at the physical location.

The location prediction module 250 uses the trained machine-learning model to predict whether a user associated with a user client device 110 is present at a physical location without relying on the beacon ID. If the likelihood that a user client device 110 is present at the location exceeds a threshold, the location prediction module 250 notifies the content selection module 215 that the user is in the location, allowing the content selection module 215 to target delivery of content items. For example, if the location prediction module 250 predicts that a user is present at a clothing boutique, the content selection module 215 might send to the user client device 110 a coupon for 10% off the user's purchase or a message with the boutique's hours of operation.

Exemplary Method

Figure 3:
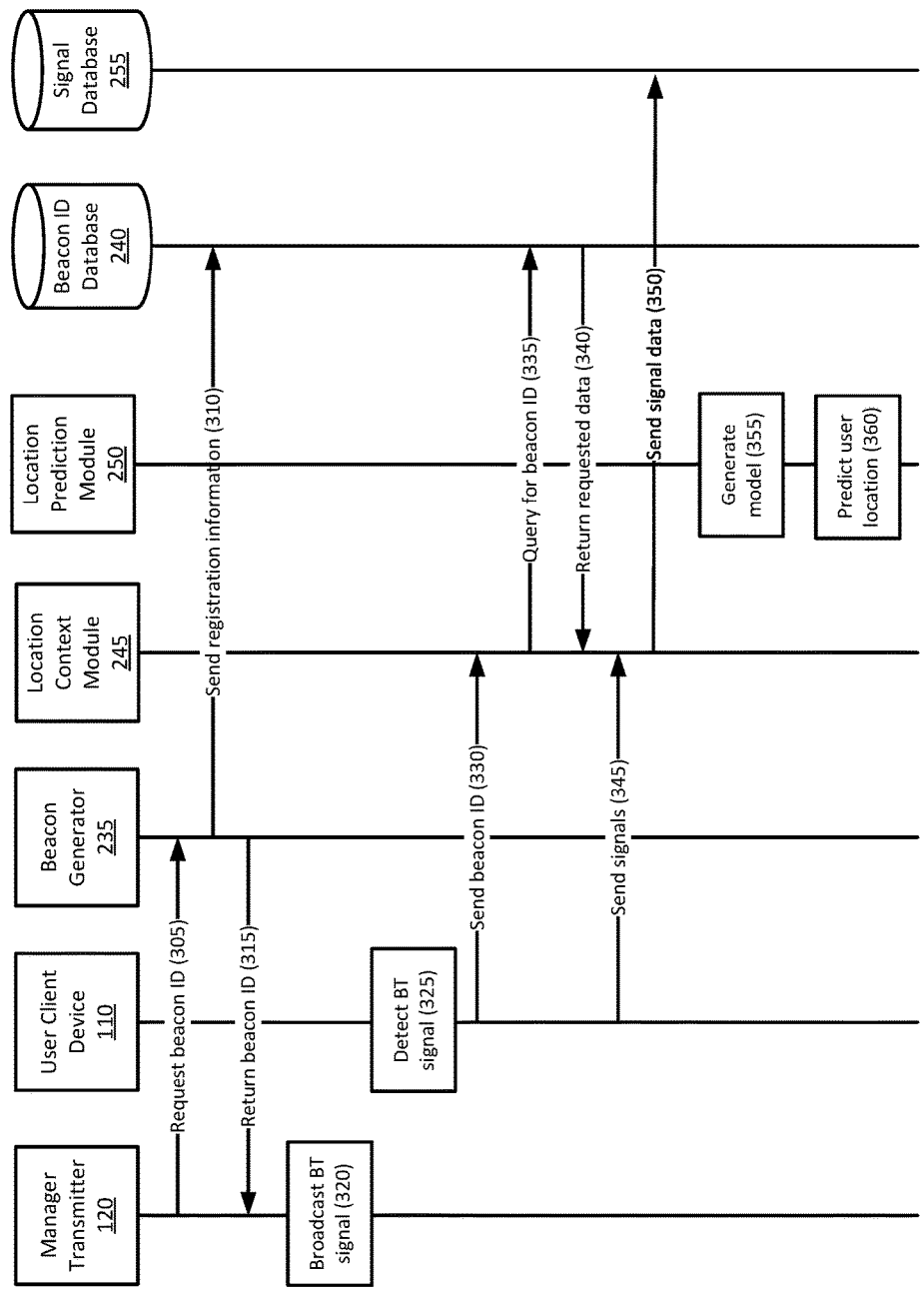
FIG. 3 is an interaction diagram illustrating an example process for improving predictive performance of a computer model, in accordance with an embodiment.

FIG. 3 is an interaction diagram illustrating an example process for improving a computer model's ability to predict the presence of online system users in a physical location, in accordance with an embodiment. At 305, the beacon generator 235 generates a unique beacon ID for a physical location. In one embodiment, the beacon generator 235 generates the beacon ID responsive to user input. In another embodiment, the beacon generator 235 automatically generates the beacon ID responsive to the user of the manager transmitter 120 registering the location as a business on the online system 150. The beacon generator also receives from the manager transmitter 120 registration information comprising the name of the business associated with the beacon ID, the name and/or online system user information for the user who requested the beacon ID and other users associated with the beacon ID, and the physical location associated with the beacon ID. At 310, the beacon generator 235 sends the received registration information to the beacon ID database 325 for storage.

The beacon generator 235 sends 315 the generated beacon ID to the manager transmitter 120 for later transmission to user client devices 110. At 320, the manager transmitter 120 broadcasts the Bluetooth signal comprising the beacon ID. In one embodiment, the online system 150 instructs the manager transmitter 120 to begin transmitting the beacon ID when the online system 150 determines that the manager transmitter 120 is present at the physical location associated with the beacon ID. In another embodiment, the online system 150 instructs the manager transmitter 120 to begin transmitting the beacon ID responsive to receiving user input comprising a request to begin transmission.

A user client device 110 detects 325 the Bluetooth signal and sends 330 the received beacon ID to the location context module 245 for identification. Responsive to receiving the beacon report from the user client device 110, the location context module 245 queries 335 the beacon ID database 240 for information about a location, such as the name of the business or organization associated with the beacon ID.

At 340, the beacon ID database 240 returns the requested information to the location context module 245, which uses the geographic information and signal strength verify that the signal is an accurate instance of a user being present at the location (i.e., that the signal is not a false positive). Responsive to detecting that the received beacon signal strength exceeds a threshold, the location context module 245 classifies the instance of the user client device 110 detecting the Bluetooth signal as an example of a user being present at the physical location associated with the beacon ID.

The location context module 245 collects 345 context information comprising signals from the user client device 110 to generate training data. In one embodiment, the context information includes the location of the user client device 110, visible wireless networks with associated network strengths, visible Bluetooth signals with associated signal strengths, altimeter reading, and time of day. The location context module 245 sends 350 the context information, along with the instance of the user client device 110 detecting the Bluetooth signal to the signal database 255 for storage.

At 355, the location prediction module 250 applies machine learning techniques to generate a machine-learning model that that is used by the online system 150 to predict whether online system users are present at the physical location associated with the beacon ID and to tailor content items sent to the user client devices 110 based on the prediction.

To generate the machine-learning model, the location prediction module 250 forms a training set of data by identifying a positive training set of instances in which the user client devices 110 are determined to be present at the physical location. In some embodiments, the location prediction module 250 also forms a negative set of training instances in which the user client devices 110 are determined not to be present at the physical location.

The location prediction module 250 uses supervised machine learning to train the machine-learning model with the collected context information of the positive training set and the negative training set serving as inputs. Once trained, the machine-learning model, when applied to context information received from a user client device 110, outputs an indication of whether the user client device 110 is present at the physical location without relying on the beacon ID.

In some embodiments, the location prediction module 250 applies a trained validation model to the received Bluetooth signals to quantify the accuracy of the machine-learning model and iteratively re-trains the machine-learning model until the occurrence of a stopping condition. Additionally or alternatively, the location prediction module 250 filters out false positive instances to improve the machine-learning model by, for example, polling user client devices or weighting the value of the training sample based on Bluetooth signal strength, as discussed above with respect to FIG. 2.

The location prediction module 250 uses the trained machine-learning model to predict 360 whether a user associated with a user client device 110 is present at a physical location responsive to receiving context information from the user client device 110. Responsive to determining that the likelihood that a user client device 110 is present at the location with a certainty level exceeding a threshold, the location prediction module 250 notifies 360 notifies the content selection module 215 that the user is in the location, allowing the content selection module 215 to target delivery of content items sent to the user client device 110.

Use Case

Figure 4:
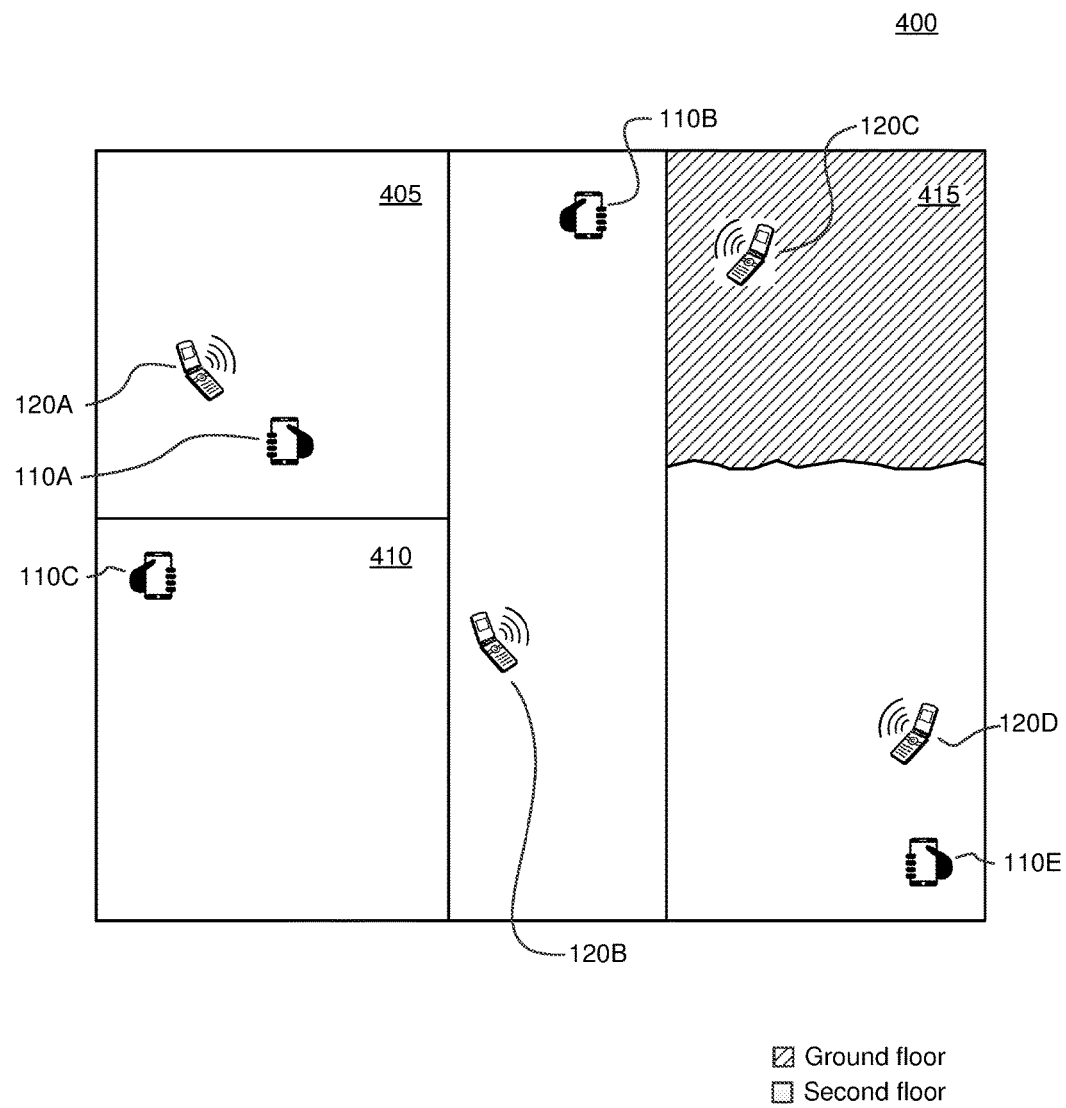
FIG. 4 illustrates an example distribution of manager transmitter and customer client devices in a physical location.

FIG. 4. illustrates an example distribution of manager transmitters 120 and user client devices 110 in a physical location 400. Within the physical location 400 are smaller physical locations 405, 410, and 415. For example, the physical location 400 might be a shopping mall and physical locations 405, 410, and 415 might be stores or other businesses within the shopping mall.

Responsive to receiving user input comprising a request to begin transmission or detecting that the manager transmitter 120A is present in the physical location 405 associated with a beacon ID, the online system 150 instructs the manager transmitter 120A to begin transmitting the Bluetooth signal. Assume that the user of the user client device 110A has allowed the online system 150 to access the location of the client device 110A and that the online system application is in use when the user enters the physical location 405 with the user client device 110A. The user client device 110A detects the Bluetooth signal comprising the beacon ID and sends the received beacon ID to the online system 150 for processing. If the signal strength exceeds a threshold (i.e., the user client device 110A is located within a threshold distance of the manager transmitter 120A based on the boundaries of the physical location 405), the online system 150 will classify the received signal as an instance of the user client device 110A being present in the physical location 405.

Unlike the user of the user client device 110A, the user of the user client device 110B is not within the boundaries of the physical location 405. Though the user client device 110B might detect the Bluetooth signal comprising the beacon ID, the signal strength will not exceed the threshold necessary to classify the signal as an instance of the user client device 110B being present in the physical location 405. Similarly, the user client device 110C will likely detect the Bluetooth signal and is likely within a threshold distance of the manager transmitter 120A. However, the online system 150 will not classify the received signal as an instance of the user client device 110C being present in the physical location 405 because the user client device 110C is not within the boundaries of the physical location 405 as input by the user of the manager transmitter 120A.

Assume that the manager transmitter 120B is a portable computing device that is associated with the physical location 410. The manager transmitter 120B was transmitting a Bluetooth signal comprising a beacon ID while in the physical location 410, but left the physical location 410 without stopping the transmission. Responsive to determining that the manager transmitter 120B is no longer present in the physical location 410, the online system 150 automatically stops transmission of the Bluetooth signal regardless of whether the user of the manager transmitter 120B has provided user input comprising an instruction to stop transmission.

Assume that the physical location 415 is a two-story department store within the shopping mall 400. The user of the manager transmitter 120C provides input comprising the boundaries of the physical location 415. While in some embodiments the online system 150 uses an altimeter to exclude signals from different floors, in embodiments where the physical location comprises multiple floors, the online system 150 does not automatically exclude these signals.

In one embodiment, more than one manager transmitter 120 is associated with a physical location. For example, assuming that the physical location 415 is a two-story department store, the manager transmitters 120C and 120D may be located on different floors and/or opposite sides of the physical location 415 to maximize the online system 150's ability to accurately classify received signals in different areas as instances of user client devices 110 being present in the physical location 415. For instance, while the user client device 110E might detect the Bluetooth signal transmitted by the manager transmitter 120C, the signal strength might not exceed the threshold if the user client device 110E is located on a different floor and/or on the opposite side of the physical location 415 (e.g., the user client device 110E is in the back right corner of the second floor and the manager transmitter 120C is in the front left corner of the ground floor). However, if the user client device 110E is within a threshold distance of a second manager transmitter 120D, the online system 150 will classify the received signal as an instance of the user client device 110E being present in the physical location 415.

Additional Considerations

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may be comprise a general-purpose computing device selectively activated or reconfigured by a computer program stored on a computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Finally, the language used in the specification has been principally selected for readability and instructional purposes; it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A method comprising:
   receiving, from a transmitter associated with a first user of an online system, a request to generate a beacon identifier associated with a physical location;
   sending the beacon identifier to the transmitter;
   receiving, from a client device associated with a second user of the online system, a request to identify a received beacon identifier;
   identifying the received beacon identifier as associated with the physical location;
   responsive to detecting that a signal strength associated with the received beacon identifier exceeds a threshold, classifying the client device as present at the physical location;
   receiving a first set of context information comprising signals received by the client device when present at the physical location and adding the first set of context information to training data comprising instances of client devices being present at the physical location; and
   training a machine-learning model using the training data to predict a likelihood that a third user of the online system is present at the physical location based on a second set of context information comprising signals received from a client device associated with the third user, wherein the second set of context information used by the machine-learning model for its prediction does not include a signal of the beacon identifier.

2. The method of claim 1, further comprising:
   verifying a position of the transmitter; and
   responsive to the transmitter being located within a threshold distance of the physical location, adding the first set of context information to the training data.

3. The method of claim 1, wherein the first or second set of context information comprises one or more of: visible wireless networks, visible Bluetooth signals, altimeter reading, and time of day.

4. The method of claim 1, wherein the training data further comprises instances of client devices not being present at the physical location.

5. The method of claim 1, further comprising targeting delivery of content items to the client device associated with the third user responsive to the prediction.

6. The method of claim 1, further comprising instructing the transmitter to transmit the beacon identifier responsive to detecting that the transmitter is present at the physical location.

7. The method of claim 1, further comprising instructing the transmitter to transmit the beacon identifier responsive to user input comprising a request to begin transmission.

8. The method of claim 1, further comprising applying a trained validation model to quantify accuracy of the machine-learning model.

9. The method of claim 1, further comprising iteratively re-training the machine-learning model responsive to the machine-learning model not reaching an accuracy measurement over a threshold.

10. The method of claim 1, further comprising weighting a value of the training data based on the signal strength of the received beacon identifier.

11. A non-transitory computer readable storage medium storing instructions that, when executed by a computing system, cause the computing system to perform operations comprising:
   receiving, from a transmitter associated with a first user of an online system, a request to generate a beacon identifier associated with a physical location;
   sending the beacon identifier to the transmitter;
   receiving, from a client device associated with a second user of the online system, a request to identify a received beacon identifier;
   identifying the received beacon identifier as associated with the physical location;
   responsive to detecting that a signal strength associated with the received beacon identifier exceeds a threshold, classifying the client device as present at the physical location;
   receiving a first set of context information comprising signals received by the client device when present at the physical location and adding the first set of context information to training data comprising instances of client devices being present at the physical location; and training a machine-learning model using the training data to predict a likelihood that a third user of the online system is present at the physical location based on a second set of context information comprising signals received from a client device associated with the third user, wherein the second set of context information used by the machine-learning model for its prediction does not include a signal of the beacon identifier.

12. The non-transitory computer readable storage medium of claim 11, further comprising:

verifying a position of the transmitter; and responsive to the transmitter being located within a threshold distance of the physical location, adding the first set of context information to the training data.

13. The non-transitory computer readable storage medium of claim 11, wherein the first or second set of context information comprises one or more of: visible wireless networks, visible Bluetooth signals, altimeter reading, and time of day.

14. The non-transitory computer readable storage medium of claim 11, wherein the training data further comprises instances of client devices not being present at the physical location.

15. The non-transitory computer readable storage medium of claim 11, further comprising targeting delivery of content items to the client device associated with the third user responsive to the prediction.

16. The non-transitory computer readable storage medium of claim 11, further comprising instructing the transmitter to transmit the beacon identifier responsive to detecting that the transmitter is present at the physical location.

17. The non-transitory computer readable storage medium of claim 11, further comprising instructing the transmitter to transmit the beacon identifier responsive to user input comprising a request to begin transmission.

18. The non-transitory computer readable storage medium of claim 11, further comprising applying a trained validation model to quantify accuracy of the machine-learning model.

19. The non-transitory computer readable storage medium of claim 11, further comprising iteratively re-training the machine-learning model responsive to the machine-learning module not reaching an accuracy measurement over a threshold.

20. The non-transitory computer readable storage medium of claim 11, further comprising weighting a value of the training data based on the signal strength of the received beacon identifier.

* * * * *